US012079828B2

(12) United States Patent
Jabri et al.

(10) Patent No.: US 12,079,828 B2
(45) Date of Patent: Sep. 3, 2024

(54) MULTI-CHANNEL DEMAND PLANNING FOR INVENTORY PLANNING AND CONTROL

(71) Applicant: Target Brands, Inc., Minneapolis, MN (US)

(72) Inventors: Omar N. Jabri, Sunnyvale, CA (US); Adam Riggall, Minneapolis, MN (US); Duane Sizemore, Minneapolis, MN (US); Peter Kim, Minneapolis, MN (US); Tikhon Jelvis, Berkeley, CA (US); Yang Liu, Minneapolis, MN (US); Saibal Bhattacharya, San Mateo, CA (US); Sayon Majumdar, Sunnyvale, CA (US); Zeynep Erkin Baz, San Francisco, CA (US)

(73) Assignee: Target Brands, Inc., Minneapolis, MN (US)

( * ) Notice: Subject to any disclaimer, the term of this patent is extended or adjusted under 35 U.S.C. 154(b) by 38 days.

(21) Appl. No.: 17/529,075

(22) Filed: Nov. 17, 2021

(65) Prior Publication Data

US 2023/0153844 A1      May 18, 2023

(51) Int. Cl.
*G06Q 30/02*   (2023.01)
*G06Q 10/067*  (2023.01)
*G06Q 10/087*  (2023.01)
*G06Q 30/0202* (2023.01)
*G06Q 30/0601* (2023.01)

(52) U.S. Cl.
CPC ....... *G06Q 30/0202* (2013.01); *G06Q 10/067* (2013.01); *G06Q 10/087* (2013.01); *G06Q 30/0625* (2013.01)

(58) Field of Classification Search
None
See application file for complete search history.

(56) References Cited

U.S. PATENT DOCUMENTS

| 10,423,922 B2 | 9/2019 | Harsha et al. |
| 2002/0188499 A1* | 12/2002 | Jenkins ............... G06Q 10/087 705/28 |

(Continued)

OTHER PUBLICATIONS

Chen et al. (Performance analysis of demand planning approaches for aggregating, forecasting and disaggregating interrelated demands, International Journal of Production Economics, vol. 128, Issue 2, 2010, pp. 586-602, ISSN 0925-5273, https://doi.org/10.1016/j.ijpe.2010.07.006.).*

(Continued)

*Primary Examiner* — Matthew D Henry
(74) *Attorney, Agent, or Firm* — Merchant & Gould P.C.

(57) ABSTRACT

Methods and systems for forecasting demand for items across multiple channels are disclosed. In some implementations, multi-channel demand forecasting may be performed on a per-item, per-location basis, by selectively generating item-location forecasts for each item and location within a supply chain for each channel, or disaggregating a chain level forecast on a per-item basis to each location. Particular selection of an appropriate model, and selective training of models, allows for efficient computation of such forecasts across a large supply chain with thousands of locations and hundreds of thousands, or millions, of items for which forecasts are generated.

20 Claims, 9 Drawing Sheets

(56) References Cited

U.S. PATENT DOCUMENTS

| | | | |
|---|---|---|---|
| 2011/0071885 A1* | 3/2011 | Ayres de Castro | G06Q 30/0202 705/7.31 |
| 2017/0330211 A1 | 11/2017 | Deshpande et al. | |
| 2018/0322517 A1 | 11/2018 | Rosenberg et al. | |
| 2020/0074485 A1* | 3/2020 | Popescu | G06Q 30/0202 |
| 2020/0134640 A1 | 4/2020 | Morgan et al. | |

OTHER PUBLICATIONS

Katta, Sasanka et al., Building a Machine Learning based demand forecasting platform, (Medium article, available at: https://medium.com/walmartglobaltech/building-a-machine-learning-based-demand-forecasting-platform-d8c0841c1f07), Dated: Jan. 3, 2021, 10 Pages.

* cited by examiner

MULTI-CHANNEL DEMAND PLANNING FOR INVENTORY PLANNING AND CONTROL

TECHNICAL FIELD

The present disclosure relates generally to methods and systems for forecasting demand for items across multiple channels.

BACKGROUND

Demand forecasting involves predicting future demand for products or services of a business or organization. Demand forecasting produces valuable information for businesses to use in production planning, inventory management, staff scheduling, and supply chain management. It is important to know how much inventory is needed to order and stock at various locations of a retail chain. Demand forecasting information can be useful not only for inventory management, but for scheduling personnel, planning marketing events, and budgetary planning.

At its most basic, forecasting demand may involve simply estimating demand using judgment based on past experience, which may be effective for smaller businesses or more predictable businesses. In more complex situations, demand can be calculated using a variety of statistical models and algorithms. Such models and algorithms typically rely on past data to predict future demand.

It can be difficult to accurately predict future demand for products, especially when taking into account seasonal changes in demand for particular products. This is further complicated for retailers offering a multitude of products, e.g. millions. There is a need for improved methods of forecasting demand for a large number of products taking into account seasonal changes in demand.

For large retail organizations, particularly those which are distributed over a large geographical area, it is not uncommon for different retail locations to carry different collections of items for sale. As such, demand predictions for any given location within a retail enterprise may be localized to a particular retail location, especially for physical, in-store item sales. Also in some instances, large retail organizations may also fulfill digital orders (e.g., orders received via a website) from either warehouses, or in some instances, from stores (as examples of retail locations). This drastically complicates the way in which demand may be attributed to a particular location. For example, while total demand for an item from a particular retail location may be driven by both in-store sales and online order fulfillment, any online orders fulfilled from a given location may not be properly attributed to that location. This may be because the decision to fulfill a digital order from a particular retail location may be based on a customer request to pick up the item at that particular retail location, or may be based on a decision of the retailer to fulfill an online order from that location by shipping the item to the customer. In the first case, item demand may be properly attributable to the retail location, but in the second case, the particular retail location is not a factor in the customer's purchasing decision, so attributing demand to that location is somewhat arbitrary, and may in fact be incorrect. It may also be the case that digital demand may be attributed to a particular store or warehouse location simply because that store or warehouse has the item in stock at the time an order is received, rather than the location being the most appropriate location from which item fulfillment should occur. In this case as well, attributing demand on a location-specific basis is likely inaccurate.

SUMMARY

In summary, the present disclosure relates to methods and systems for forecasting demand for items across multiple channels. In some implementations, multi-channel demand forecasting may be performed on a per-item, per-location basis, by selectively generating item-location forecasts for each item and location within a supply chain for each channel, or disaggregating a chain level forecast on a per-item basis to each location. Particular selection of an appropriate model, and selective training of models, allows for efficient computation of such forecasts across a large supply chain with thousands of locations and hundreds of thousands, or millions, of items for which forecasts are generated.

In a first aspect, a system for forecasting demand for each of a plurality of items sold through multiple sales channels of a retail enterprise having a plurality of locations is disclosed. The system includes at least one processor and at least one memory device, the memory device storing instructions that, when executed by the at least one processor, cause the system to perform a method. The method includes training a generalized additive model (GAM) using historical sales data of a retail enterprise, the historical sales data including online sales data, to determine an overall item demand forecast for a future time period, and separating the overall item demand forecast into a localized item demand forecast and a non-localized item demand forecast based, at least in part, on an item eligibility for localized item fulfillment and historical localized and non-localized item ordering information. The method also includes, for the non-localized item demand forecast, determine a portion of non-localized item demand able to be fulfilled from a retail location and a remaining portion of non-localized item demand to be fulfilled from a warehouse. The method includes disaggregating the portion of non-localized item demand able to be fulfilled from a retail location at a location level to attribute sub-portions of the non-localized item demand to each of a plurality of retail locations, and disaggregating the localized item demand forecast into localized item demand at each of the plurality of retail locations. The method also includes combining the disaggregated localized item demand and the disaggregated non-localized item demand for each respective one of the plurality of retail locations to determine an overall online item demand for each of the plurality of retail locations. The method further includes, in response to a request for item demand at an API exposed by the system from a consumer system, the request identifying at least one item and one or more of the plurality of retail locations, returning, to the consumer system, an overall online item demand forecast for the at least one item at the one or more of the plurality of retail locations.

In a second aspect, a method of forecasting sales-channel specific demand through a retail supply chain fulfilling sales transactions received via multiple channels from a common set of retail locations is disclosed. The method includes training a generalized additive model (GAM) using historical sales data of a retail enterprise, the historical sales data including online sales data, to determine an overall item demand forecast for a future time period. The method also includes separating the overall item demand forecast into a localized item demand forecast and a non-localized item demand forecast based, at least in part, on an item eligibility for localized item fulfillment and historical localized and non-localized item ordering information. The method further includes, for the non-localized item demand forecast, determine a portion of non-localized item demand able to be fulfilled from a retail location and a remaining portion of non-localized item demand to be fulfilled from a warehouse. The method also includes disaggregating the portion of non-localized item demand able to be fulfilled from a retail location at a location level to attribute sub-portions of the non-localized item demand to each of a plurality of retail locations, and disaggregating the localized item demand forecast into localized item demand at each of the plurality of retail locations. The method includes combining the disaggregated localized item demand and the disaggregated non-localized item demand for each respective one of the plurality of retail locations to determine an overall online item demand for each of the plurality of retail locations. The method includes, in response to a request for item demand at an API exposed by the system from a consumer system, the request identifying at least one item and one or more of the plurality of retail locations, returning, to the consumer system, an overall online item demand forecast for the at least one item at the one or more of the plurality of retail locations.

In a further aspect, s system for forecasting demand for each of a plurality of items sold through multiple sales channels of a retail enterprise having a plurality of locations is disclosed. The system includes at least one processor and at least one memory device, and the memory device stores instructions that, when executed by the at least one processor, cause the system to perform the following: training a generalized additive model (GAM) using historical sales data of a retail enterprise for each of a plurality of items carried by the retail enterprise, the historical sales data including online sales data, to determine an overall item demand forecast for a future time period for each of the plurality of items, in accordance with a training frequency that is based, at least in part, on sales behavior of the item reflected in the historical sales data. For at least one item of the plurality of items, the system performs: separating the overall item demand forecast into a localized item demand forecast and a non-localized item demand forecast based, at least in part, on an item eligibility for localized item fulfillment and historical localized and non-localized item ordering information; for the non-localized item demand forecast, determine a portion of non-localized item demand able to be fulfilled from a retail location and a remaining portion of non-localized item demand to be fulfilled from a warehouse; disaggregating the portion of non-localized item demand able to be fulfilled from a retail location at a location level to attribute sub-portions of the non-localized item demand to each of a plurality of retail locations; disaggregating the localized item demand forecast into localized item demand at each of the plurality of retail locations; combining the disaggregated localized item demand and the disaggregated non-localized item demand for each respective one of the plurality of retail locations to determine an overall online item demand for each of the plurality of retail locations; and in response to a request for item demand at an API exposed by the system from a consumer system, the request identifying the at least one item and one or more of the plurality of retail locations, returning, to the consumer system, an overall online item demand forecast for the at least one item at the one or more of the plurality of retail locations.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
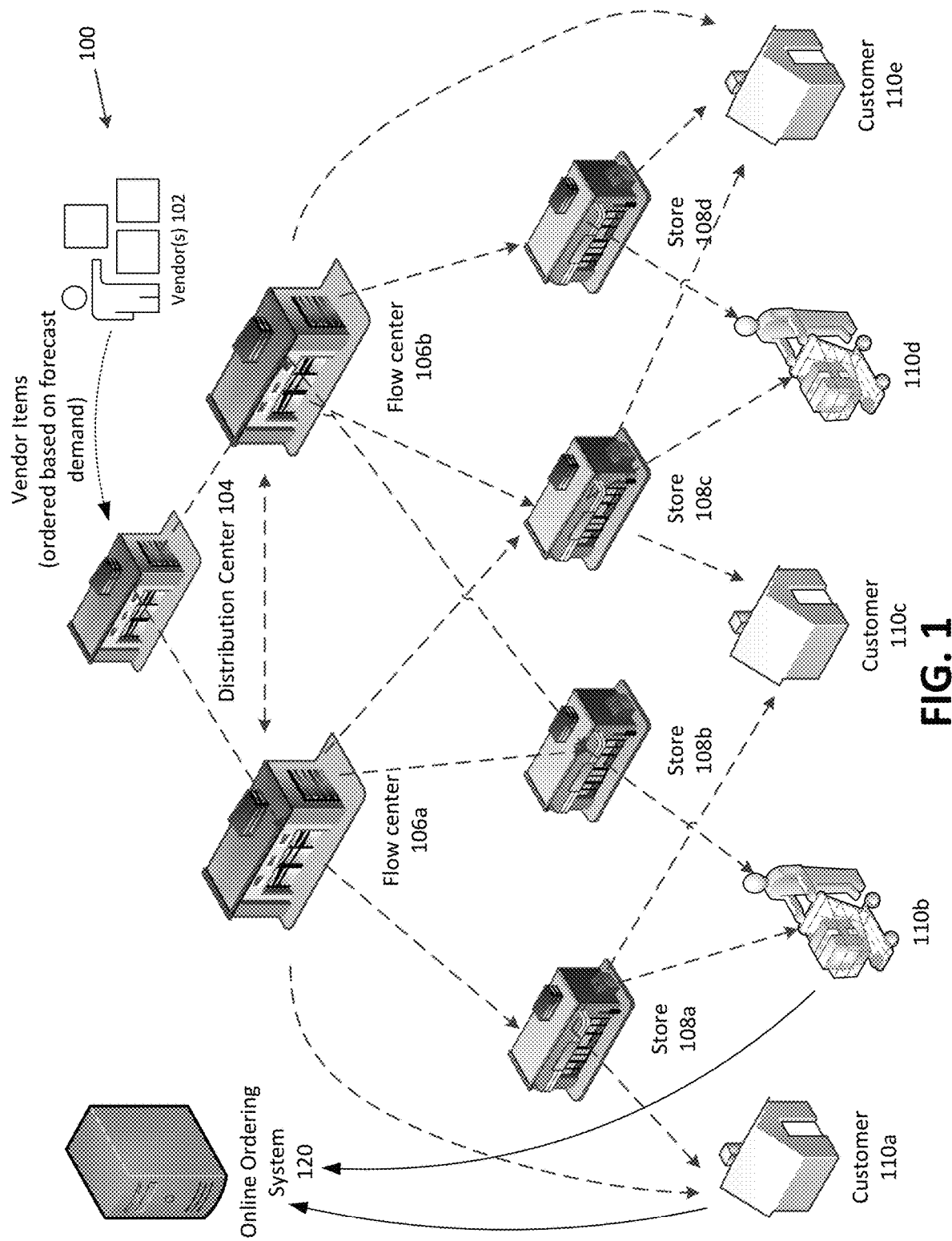
FIG. 1 illustrates a schematic diagram of an example portion of a retail supply chain within which aspects of the present disclosure may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for forecasting demand for a plurality of items. In particular, the demand forecasting system and methods described herein are useful for predicting demand of products in a retail context. In particular examples, the methods and systems described herein are particularly advantageous in forecasting separate demand components for in-store sales as well as sales via digital systems, which may or may not be localized to a particular store by the customer. By separately determining forecast demand components, future forecast may be better attributed to locations within a retail supply chain (e.g. "nodes", including warehouses and stores).

In example aspects, an enterprise wide digital originated demand may be generated, and disaggregated on a per item basis to individual locations. In other examples, a more optimized, localized digital demand forecasts may be generated. An overall demand forecasting architecture allows for selection between disaggregated digital demand and localized digital demand forecasting. Model management processes are also described which manage retraining of forecasting models in a manner that is sensitive to the updates in item demand or availability of historical item demand, and which may reduce computational complexity of generating per-item, per-location, and per-channel forecasts across a large-scale retail supply chain.

The systems and methods described herein are generally more applicable to retailers offering thousands or millions of different items for sale. These items are sold at hundreds of retail stores and there are also hundreds of distribution centers. It is very difficult to manage demand for such a wide variety of items at so many locations. Some items are in demand everywhere on a daily basis, while others only sell occasionally and may only be in demand in certain locations. Thus, the information needed to determine how to position inventory to meet demand needs to be accurate. Due to the large number of items and locations, the process of analyzing that information has to be efficient in order to effectively utilize the information for demand planning purposes.

The systems and methods described herein have a number of advantages in the context of such a large scale supply chain, an example of which is described below. In particular, placement of appropriate volumes and selections of items at the various locations within the supply chain allow for improved responsiveness to customer ordering behavior. Customers are increasingly expecting relatively short delivery time frames for all types of items (e.g., within 1 to 2 days). By better attributing demand, and forecasting demand, at individual locations for individual items within a large-scale supply chain, item placement planning may be improved, which improves responsiveness and efficiency of the overall supply chain.

As may be expected in such a system, the number of different types of forecasting models (e.g., on a per channel, per location, per item basis) can require significant computational resources. As described herein, such computational challenges may be addressed by managing the extent to which models are created, trained, and scored based on the attributes of particular locations or items that are forecasted.

I. Example Large Scale Retail Enterprise Supply Chain Architecture with Flexible Delivery Models FIG. 1 illustrates a schematic diagram 100 of an example supply chain for a retail enterprise, in which aspects of the present disclosure may be implemented. The diagram 100 illustrates the flow of inventory from vendor 102 to customer 110. The inventory moves through various nodes to arrive at the customer. In this example, the nodes include a distribution center 104, two flow centers 106a, 106b, four retail stores 108a, 108b, 108c, 108d, and ultimately to various customers, such as to customers 110b, 110d who obtain items via in-store shopping and/or order pickup from a particular store, as well as three customer residences 110a, 110c, 110e, which may receive goods in response to online orders. In practice, the supply chain could include many more nodes in different proportions. In some embodiments, there are not separate receive centers and flow centers. Instead, there may be one type of warehouse or distribution center for holding inventory before distributing to stores and customers. Dashed-line arrows in the diagram indicate movement of inventory. Inventory will typically flow downward through the supply chain, but in some instances inventory may move between flow centers 106 or between retail stores 108. In some embodiments, inventory may even move from a flow center 106 to a distribution center 104 or from a retail store 108 to a flow center 106.

In the example shown, in some instances items may be either shipped from a store to a customer, or may be picked up by a customer, in response to an online order. Online orders may be submitted to an online ordering system 120, depicted in solid line arrows from customer 110a, 110b.

It is further recognized that online orders will typically be submitted for fulfillment of orders delivered directly to customers, such as customer 110c, 110e. Generally speaking, each store 108 will fulfill orders in response to in-store shopping, online orders indicating a desire to pick up from a particular store, as well as online orders for which a shipment to a customer 110 is requested. For orders fulfilled in response in-store shopping or online orders indicating a desire to pick up from a particular store, such orders are considered "localized" in that a customer indicates a desire to purchase from a particular location. Online orders for which a shipment to a customer is requested may be assigned to a particular store 108 or flow center 106, but are assignable to any such store or flow center from which stock may be provided. That is, in some instances in order may be delivered from a closest store to the ZIP Code of the ordering customer, but in other instances, due to other anticipated demand for the particular item from that store or in response to excess stock at another store or flow center, it may be desirable to fulfill the online order for shipment to the customer from another location.

Vendors 102 produce/provide the items or products that will be sold by the retail entity. A purchase order is typically placed to request products from a vendor. In some instances, the vendor 102 will transport the ordered products to a distribution center 104. In other instances, the retail entity arranges for the products to be picked up from the vendor 102 and transported to the distribution center 104. Once at the distribution center 104, the products are prepared for transportation to one or more flow centers. The products may arrive from the vendors in large groupings that need to be broken down into individual units for distribution to flow centers 106 and/or stores 108. Accordingly, once received into the supply chain of the enterprise, each individual unit can be tracked and shipped among the various nodes of the supply chain (distribution centers 104, flow centers 106, and stores 108).

A variety of products are prepared for shipment to one or more flow centers 106. The flow centers 106 are typically positioned to enable quick shipment to one or more retail stores 108. Each flow center 106 may supply inventory to multiple retail stores 108. In some instances, more than one flow center 106 will send inventory to a retail store 108. For example, in FIG. 1, flow center 106a distributes inventory to stores 108a, 108b, and 108c. Flow center 106b distributes to stores 108b, 108c, and 108d. In some instances, to the extent products received at a flow center 106 are not already broken down into individual units, the products may be broken down into individual units in order to distribute individual items to stores 108, or optionally to fill online orders that will be delivered directly to customers from the flow center 106 or store 108. In the example of FIG. 1, products are shipped directly from flow center 106a to a customer 110a and from flow center 106b to customer 110c.

Once products arrive at the retail stores 108, they are either stored in a back room or displayed on shelves. This inventory is available for in-store purchases, pick-up orders, or local delivery. Depending on the location of a customer ordering products online, the shipments of products could come from one or more retail stores 108, or flow centers 106. For instance, customer 110b could receive shipments of products from either store 108b or store 108c, or both (in the instance of a multi-item purchase). In example implementations, individual stores 108 may stock only a subset of the collections of items available at either a flow center 106 or a distribution center 104. Still further, different flow centers 106 may stock different types of items, for example due to handling constraints. Still further, it is noted that, between receive centers 108, flow centers 106, and stores 108, there may be preexisting, predetermined delivery routes established. For example, there may be daily or weekly transit routes between a receive center and one or more flow centers. The distribution center can provide to the flow centers the selection of individual items that are needed by stores 108 serviced by the one or more flow centers proximate to and/or servicing those stores. The flow centers can also have daily or other periodic transportation routes established to stores that are serviced, thereby ensuring prompt replenishment of items at stores in response to item sales.

In addition, the predetermined delivery routes can be used for various purposes. For example, in some situations, the predetermined delivery routes can be used to deliver products in various forms. As explained in further detail below, items distributed via the supply chain are tracked on an individual (per-item) basis; as such, items can be delivered to stores 108 in any convenient manner. In some example embodiments, items are tracked on an individual basis, but may be grouped at a flow center 106 to simplify restocking of the store 108, for example by placing together in a package a collection of individual items of different types but which may easily be stocked conveniently once those items arrive at a store 108. For example, goods that are located in a common department, row, or shelf of a store can be grouped and packed together at the flow center 106. Once those items reach the store 108, a restocking operation can restock each of the items in that shelf, row, or department easily. Still further, because items are packed and tracked on an individual basis at the flow center and sent to stores based, at least in part, on demand signals received from stores, the item collections are based on the number of items sold and therefore the restocking operation can provide a package of items that will fit on store shelves, rather than requiring additional backroom stocking and storage.

In the context of the present disclosure, a supply chain management system is provided that assists in coordination of product shipments among nodes of the supply chain, and uses inventory models to automatically rebalance inventory within the supply chain of the enterprise to ensure predicted and actual item demand from customers of the enterprise is fulfilled to a predetermined threshold success rate. The supply chain management system allows for balancing of items across the supply chain based on inventory and demand models, as well as real time demand signals, and performs automated generation of purchase and transfer orders throughout the supply chain based on such demand and lead time calculations between paints both within and external to the supply chain. Accordingly, as noted below, substantial advantages are realized using the methods and systems of the present disclosure.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders. In other embodiments, the systems and methods could operate for distribution channels that distribute supplies to multiple locations within a business rather than selling to individual customers. Regardless of the application, the systems and methods described herein are most beneficial when used to manage a supply chain for a plurality of nodes with the goal of increasing efficiency of inventory movement by responding to both proactive and reactive demand signals in real time.

Figure 2:
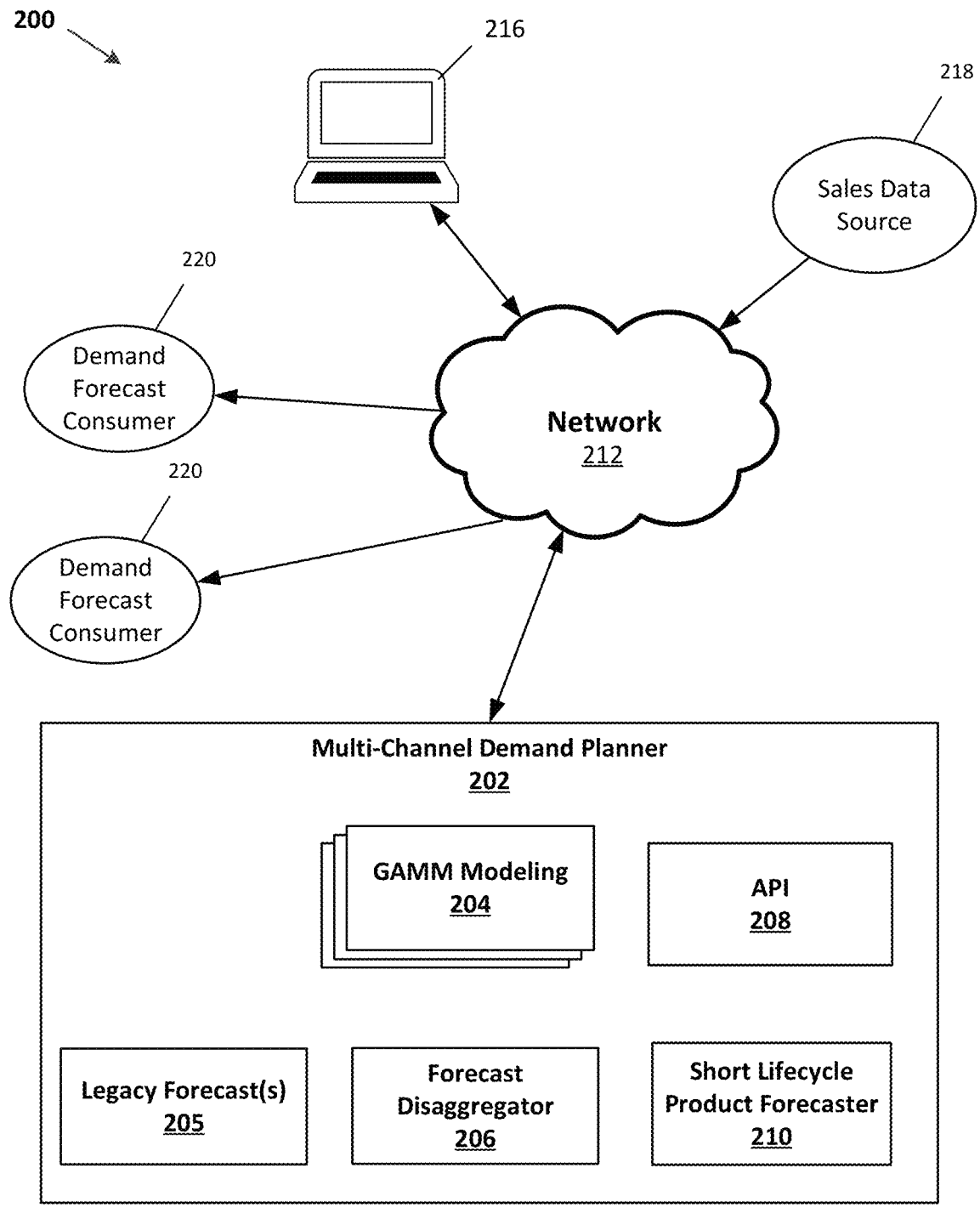
FIG. 2 illustrates an example block diagram of an example computing environment in which a multi-channel demand planning system may be used, for example within a retail organization.

II. Channel-Specific Demand Forecasting for Enterprise Supply Chain with Flexible Delivery Models FIG. 2 illustrates a schematic diagram of a system 200 for planning item demand in multiple sales channels. In the example of FIG. 2, this system 200 includes a multi-channel demand planner 202 comprising one or more generalized additive models (GAM) 204, an application programming interface 208, a forecast disaggregator 206, and a short life cycle product forecaster 210. The multi-channel demand planner 202 operates to predict demand for items both at particular locations and in general geographic areas. The multiple sales channels can include online sales and in store sales. The online sales can be attributed to particular locations such as retail stores or can be attributed generally to any location that can ship the item to a customer within an allotted amount of time. The multi-channel demand planner communicates through a network 212 with one or more computing devices 216, at least one sales data source 218, and at least one demand forecast consumer 220.

In the example shown, the GAMs 204 correspond to models configured to predict demand for a given item based on sales data received from one or more sales data sources 218. In some embodiments, the GAM 204 is a generalized additive mixed model. In example embodiments, the GAMs 204 may include a separate chain level model and individual location models. As described further below, selection of an appropriate model may include selection of one or both of the chain level and the individual location models to improve forecast accuracy. In particular, where location models may lack sufficient data or otherwise may lack context (e.g., by attributing all in person and online sales demand as attributable to that location, as compared to considering particular reasons why prior sales were assigned to the location), chain level forecasts may be used to validate local demand.

In the example shown, a legacy forecast system 205 may also be included within the multi-channel demand planner 202. The legacy forecast system 205 may, in some instances, provide chain level and location level forecasts, but may not provide channel specific forecasts for either the chain level or location level. That is, a legacy forecast system may be configured to determine or forecast demand at each of a plurality of retail locations, but does so and as a monolith, without regard to whether demand is reflected in online or in store transactions. As described further below, the legacy forecast system 205 may be integrated within a multi-channel demand planner 202 and selectively used for validation or generation of demand forecasts in particular circumstances.

In the example shown, the forecast disaggregator 206 breaks down and overall demand forecast for online sales that is generated by the GAMM models 204 based on sales channels. Additionally the forecast can be broken down based on particular locations depending on the sales channel type. For example, in instances where an item, location specific demand forecast is desired, but where no individual location forecast is available for that item, or where the forecast requires further validation, a chain level forecast may be disaggregated to the individual location, according to various sales channels. Additionally, multi-channel demand forecasts at a particular location across a classification of items may be disaggregated to a particular item where data sparsity may suggest inaccuracy of a model at the item and location level.

The API 208 operates to provide access to information generated by the multi-channel demand planner 202 to various demand forecast consumers 220. For example, the API 208 may receive requests from various demand forecast consumers 220 requesting demand for a particular sales channel at a particular location, or across a group of locations. API 208 may also receive requests for item demand at a particular location across all sales channels. In response, the multi-channel demand planner 202 may provide, via the API 208, a response including a demand forecast broken down according to the requested sales channels, items, and locations.

In the example shown, a short life cycle product forecaster 210 is configured to predict demand for items that have not been previously offered for sale and our planned to only be offered for a brief period of time. The short life cycle product forecaster 210 relies on demand forecast generated by the multi-channel demand planner 202 to predict demand for short lifecycle products that are similar to existing products that are offered for sale by the retailer. Items having a short life cycle may correspond to items newly stocked at a particular location (which may have previously been stocked at other locations), or items that are newly introduced into the overall supply chain. The short lifecycle product forecaster 210 may take a variety of approaches to generating item demand forecasts, depending on the particular item. For example, an item newly introduced at a chain level may be forecast to have demand similar to other items within a common class, or items having common characteristics to the new item. An item newly introduced at a particular location may be forecast to have demand similar to the same item at other locations having similar demand or sales profiles. Such similar locations may include, for example, locations of similar size, having similar customer demographic or sales patterns, or other commonalities.

The computing device 216 is configured to provide inputs to the multi-channel demand planner 202 as well as receive outputs from the multi-channel demand planner 202. In some embodiments, the computing device 216 is configured to present a graphical user interface to a user.

The one or more sales data sources 218 provide sales data to the multi-channel demand planner 202. Examples of sales data sources include point of sales systems and online sales systems.

Demand forecast consumers 220 utilize information generated by the multi-channel demand planner 202 for various other functions such as inventory positioning, transportation planning, and sourcing. Demand forecasts consumers 220 may utilize computing devices, such as computing device 216, to display user interfaces illustrating forecast demand for particular items and locations. Additionally, demand forecasts consumers 220 may coordinate vendor ordering processes and transport processes (e.g., allocating transportation and other logistics services) on behalf of a retail enterprise. In some examples, the multi-channel demand planner 202 may provide demand forecasts via the API 208 to such demand forecast consumers 220, which may take individualized, automated actions in response to such forecasts. Notably, due to the individualized forecasts for demand across a variety of sales channels, such actions taken by demand forecast consumers 220 may be modified, for example to route items to particular locations within a retail enterprise, or otherwise to adjust demand for particular items at particular locations.

Figure 3:
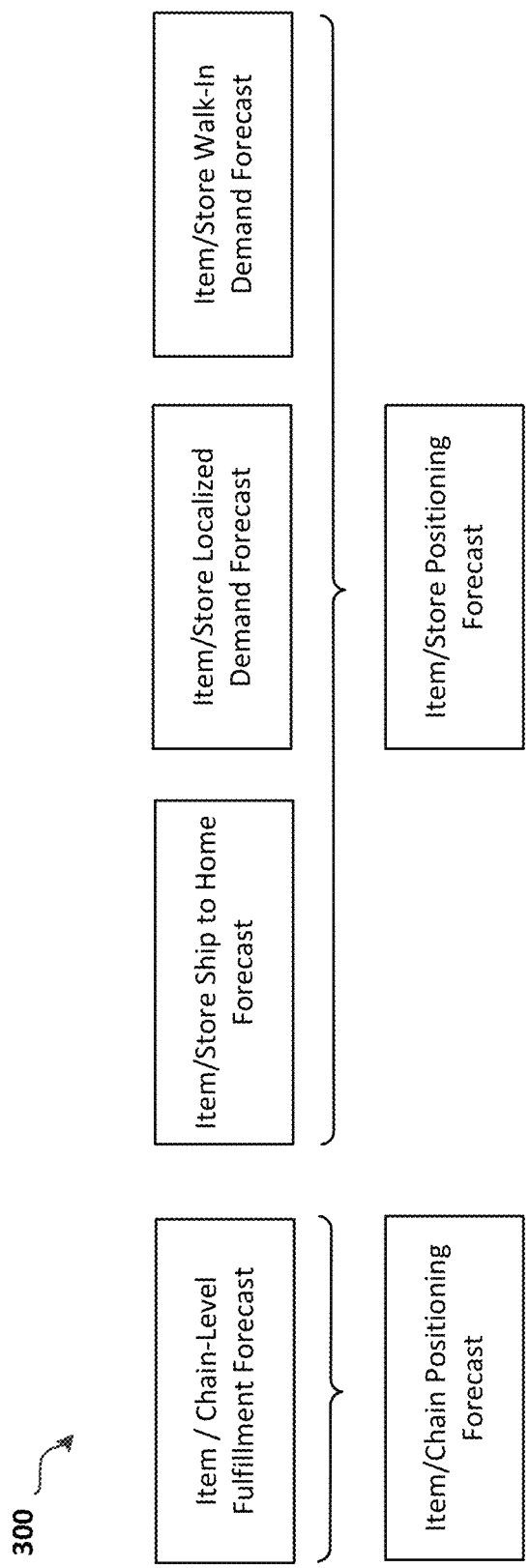
FIG. 3 illustrates a logical diagram of a breakdown of demand forecasts and relationship to item positioning.

Referring now to FIG. 3, a logical diagram 300 is shown, depicting a breakdown of demand forecasts and relationship to item positioning. In particular, and as seen in the diagram 300, an overall item fulfillment forecast at the chain level (i.e., across an entire retail enterprise) may be used for positioning of items within a retail supply chain, including timing of orders, transportation of items from vendors to warehouses, and staging of items within warehouses. However, at the item store level (i.e., at a greater location granularity), different components of a demand forecasts may be used in different ways to arrive at an overall demand for an item at a particular location, and therefore may affect the positioning forecast for such an item. In particular, as illustrated, separate forecast components may include a forecast for items at a particular location that will be shipped to a customer's home; items at a particular location that will be picked up at that location by the customer, and therefore the store or retail location is fixed; and items at a particular location that are purchased from that retail location directly (e.g., walk in purchases). Although, in the legacy forecasting systems described previously, all three components are included in a given item location forecast, there is no ability to determine the portion of forecast demand that is attributable to sales from a retail organization that are not required to be fulfilled from the particular retail location. Accordingly, by separating a demand forecast into these components, a item positioning forecasts at the store or retail location level may be made more accurately across a supply chain that utilizes a large number of retail locations for both online and in store fulfillment.

Figure 4:
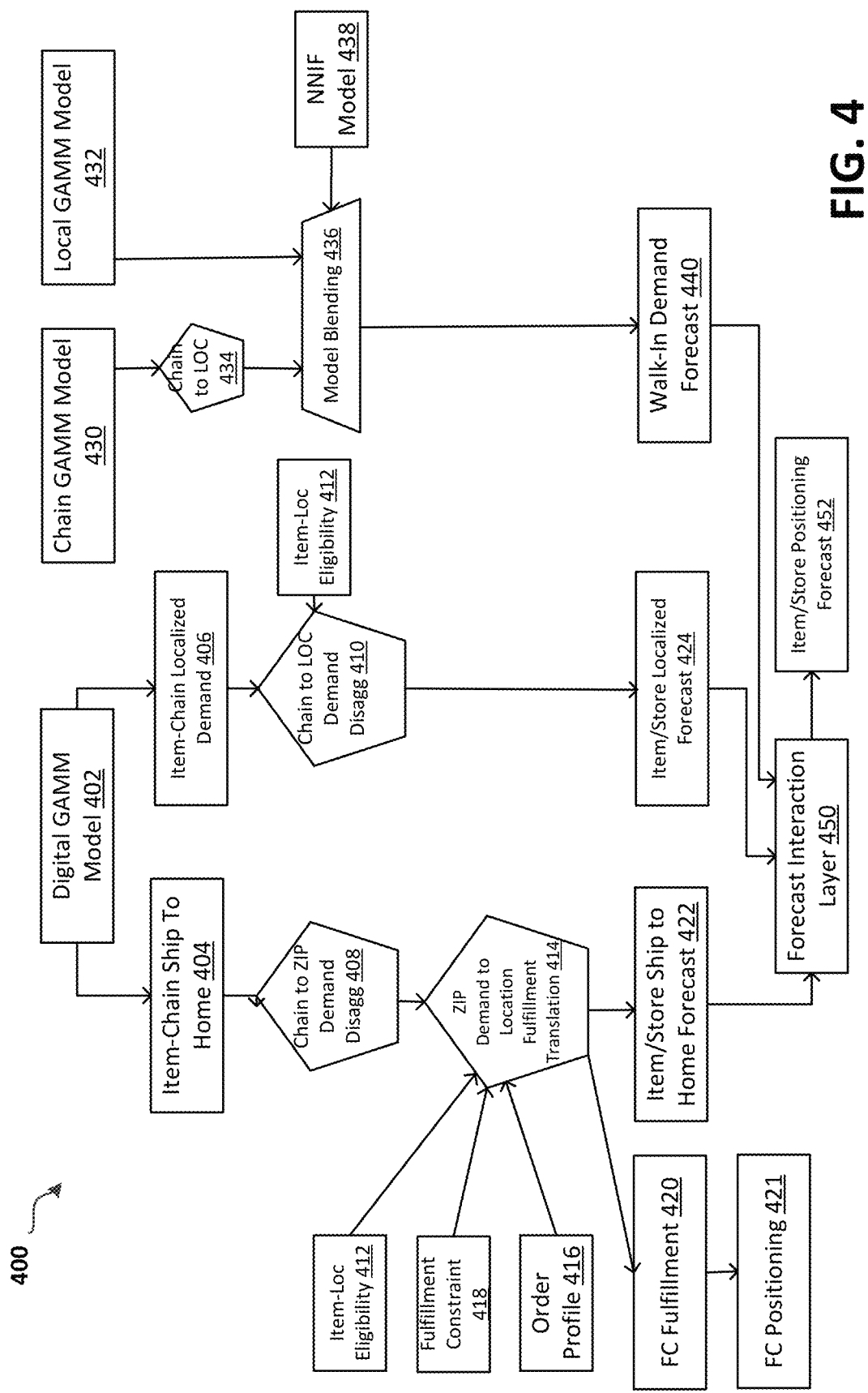
FIG. 4 is a flow chart of an example method of using chain level and localized demand forecasting models to generate localized, multi-channel demand forecasts.

FIG. 4 is a flow chart of an example method 400 of using chain level and localized demand forecasting models to generate localized, multi-channel demand forecasts. The method 400 may be performed, for example, by the multi-channel demand planner 202 of FIG. 2, using the various models managed therein.

In the example shown, the method 400 is performed using a separate set of models for a digital forecast or online sales forecast, as well as for sales at a particular location. Regarding the digital forecast, a digital GAMM model 402 may be maintained, and can be used to generate a plurality of demand forecasts for a predetermined future time frame. In the example shown, the digital GAMM model 402 may be used to generate a ship to home demand forecast 404 at the item chain level, as well as a localized demand forecast 406 at the item chain level.

The ship to home demand forecast 404 is disaggregated from the chain level to a ZIP Code level at operation 408, while the localized demand forecast 406 is disaggregated from the chain level to a particular location level at operation 410. In this case, the particular location level corresponds to a retail location of the retail enterprise. In doing so, an item location eligibility 412 is used to attribute particular item demand to particular locations eligible to carry such items.

In example embodiments, disaggregation may be performed in a number of ways. In some examples, disaggregation may be performed based on historical proportions of sales of a given item at a particular time of year within a particular ZIP Code or from a particular retail location. In further examples, additional factors may be used, such as seasonal demand trends. Details regarding example disaggregation methodologies are provided in further detail below in conjunction with FIG. 5.

In the example shown, the portion of demand disaggregated from chain level to ZIP Code is associated with a particular retail location at operation 414. In example embodiments, the Association of ZIP Code-based demand to a store location is based on order profiles 416, fulfillment constraints for particular locations 418 (e.g., the extent to which a particular location may stock a predetermined number or admitted number of items at a given time), and item location eligibility 412 (whether a particular retail location stocks the item that is ordered in a ship to home digital order).

In the example shown, this location attributed ship to home demand is provided to a fulfillment system 420, which defines fulfillment of items from a warehouse, such as a flow center or distribution center. The fulfillment system 420 may use this demand for specific item positioning of items at a flow center, as well as planning for distribution of items from a flow center to stores or other retail locations, e.g., via an item positioning system 421. The location attributed ship to home demand is also provided as an item store ship to home forecast 422.

Concurrently, the item chain localized demand (i.e., online orders for which a customer may designate a particular store, such as for item pickup) which is disaggregated at operation 410 results in an item store localized forecast 424. Both the item store ship to home forecast 422 and the item store localized forecast 424 are provided to a forecast interaction layer 450, described below.

Concurrently, additional models may be used to determine other types of demand, such as walk in demand at a particular store locations. In the example seen in FIG. 4, in-store demand may be modeled using a chain model 430 as well as a local model 432. Both the chain model 430 and the local model 432 are generated on a per item basis. The use of the chain model may be to validate the local item model, or otherwise to assist when a local model may lack sufficient data to generate accurate forecasts for a particular item.

In the example shown, the chain model 430 is disaggregated at operation 434, to break down the chain level item specific demand to the location level. This disaggregated chain level demand and the local model 432 are provided to a model blending operation 436. The model blending operation 436 may combine the disaggregated chain level model and local model information, for example using a nearest-neighbor item forecast (NNIF) model 438, to generate a walk-in demand forecast 440 for a particular item at a particular location. The walk in demand forecast 440 is provided, alongside the item store ship to home forecasts 422 and the item store localized forecast 424 to the forecast interaction layer 450.

In example embodiments, the forecast interaction layer 450 may provide a user interface at which separate demand components for a given item may be visualized for any given item at any given location. Additionally, in some instances, the forecast interaction layer 450 may allow for re-aggregation of items, such that item demand may be viewed at a region or chain level. The forecast interaction layer 450 may receive a forecast timeframe, and identification of an item or class of items, and identification of a location or locations, and may generate a positioning forecast 452 for that combination of parameters. The positioning forecasts 452 may be used for purposes of item planning, for example in combination with ordering systems and lead time calculation systems to ensure that an appropriate selection and inventory of items is provided at each retail location at appropriate times.

Additionally, because separate components of a demand forecast are used as part of the positioning forecast 452, item positioning may be more flexibly managed, since some portion of the forecast demand is not necessarily required to be fulfilled from the particular store to which that demand is attributed. For example, at least the component of demand reflected in the item store ship to home forecast 422 may be adjusted in terms of positioning to accommodate any uncertainty or variability in demand at other locations.

Figure 5:
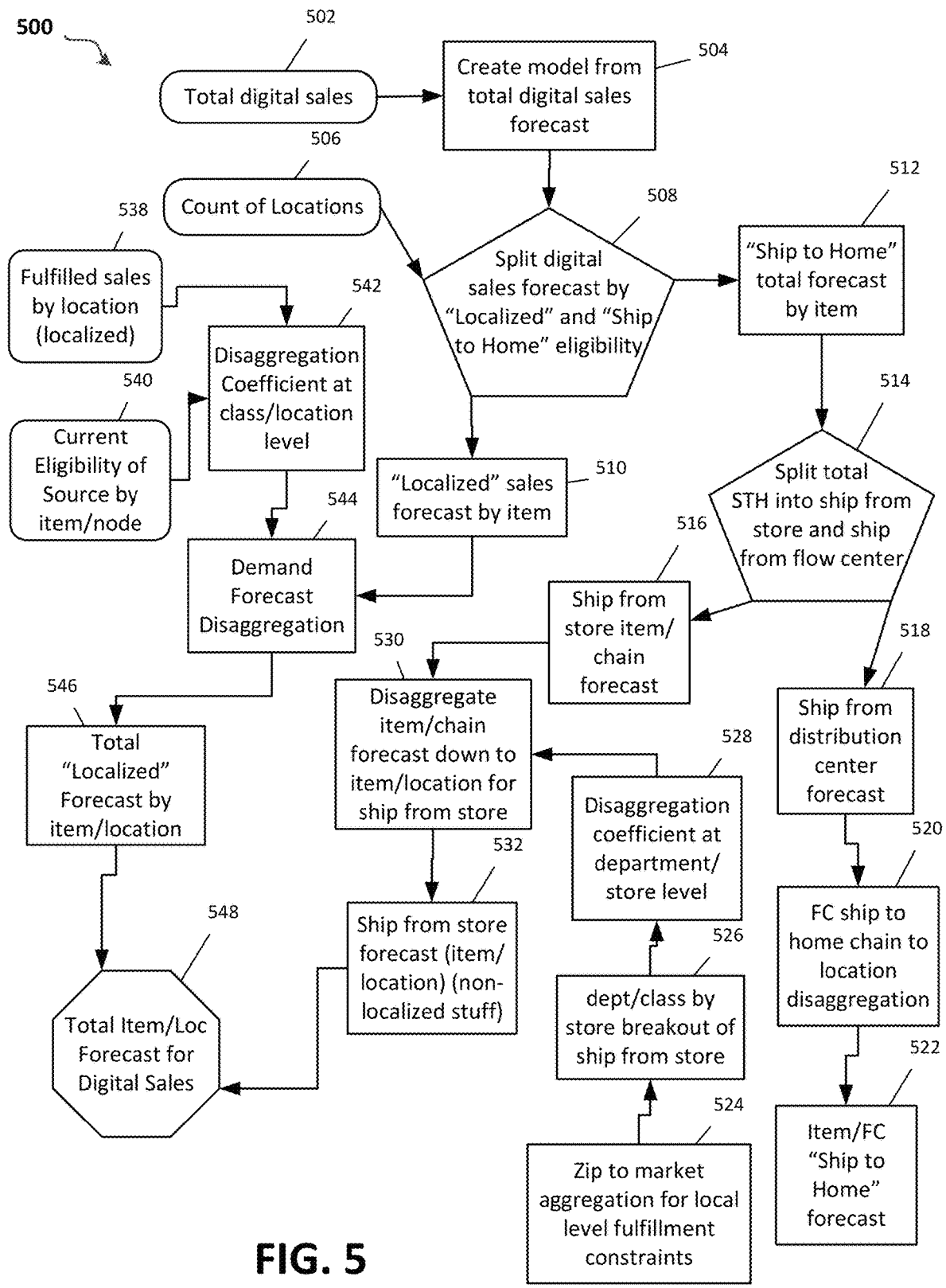
FIG. 5 shows a more detailed schematic diagram of an example method of managing and attributing digital demand forecasts to individualized locations, for example by disaggregation of chain level forecasts.

FIG. 5 is a flow chart illustrating an example method 300 of planning for demand of items through multiple sales channels. In some embodiments, this method 300 is performed by the system of FIG. 1.

At operation 502, total digital sales are accessed from a data source. In some embodiments, the data source may correspond to online point-of-sale systems used by a retail enterprise.

At operation 504, the total digital sales for a given period of time are used to generate a model for forecasting total digital sales. In some embodiments, the model is a generalized additive model (GAM). In some embodiments, the GAM is a generalized additive mixed model (GAMM). In particular examples, multiple models may be generated. As noted above in conjunction with FIG. 4, both chain level and location level models may be generated for each individualized item. Because, in a example retail organization, hundreds of thousands to millions of items are carried and offered for sale, this may result in a significant number of models being generated, with multiple models generated for each item.

At operation 506, a count of locations in the supply chain is accessed from a data source. The total digital sales forecast generated by the model at operation 504 is split into two separate forecasts for the given time period. In some embodiments, the first forecast is for "localized" sales and the second forecast is for "ship to home" sales. The split is performed based on determining which items and locations are eligible for localized sales and which are eligible for ship to home sales. This may be defined, at least in part, based on a selected delivery mode by the customer. For example a customer may elect to pick up an item and store, or may elect to have the item shipped to their home. In some instances, items may only be eligible for pickup in-store, while other items may only be eligible for shipment to home.

At operation 510, the localized sales forecast is generated. Localized sales refers to digital sales that are made for fulfillment by a particular location within the supply chain. In other words, when an order for one or more items is made online, a particular retail store is selected to fulfill that order. For example, a customer may place an order for items that he or she wants to pick up from a particular store located near his or her home. Examples of digital sales that are localized can include orders made for pick up at a particular retail store (whether by in-store pick-up, drive-up pick-up, or other means by which a customer can pick up an order at a store) as well as orders placed for delivery to a customer where the items of the order are obtained at a given store (e.g., for delivery via a third party delivery service, such as a crowdsourced third party delivery service). In some embodiments, the localized digital sales also includes digital orders that are placed to pick up items at a given store even though that store may not have the items in stock. The ordered items are shipped from warehouses, distribution centers, or other stores to the store selected by the customer. When the order has arrived at the store, the customer receives a notification and can go pick up the order.

At operation 512, the ship to home (STH) forecast is generated. STH sales for digital orders are considered to be non-localized sales because it does not matter to the customer which location the item originates from. For traditional orders for items to be delivered to a customer in two or more days, the items are sourced from distribution centers, warehouses, other stores, etc. and are shipped directly to the customer. Where the items originate from is limited only by the promised delivery date. Thus, the digital demand associated with these orders is not attributable to any particular location within the supply chain.

At operation 514, the total STH forecast is split into a ship from store forecast 516 and a ship from distribution center forecast 518. The STH forecast may be split based on which stores and which distribution centers carry a particular item, as well as the geographic proximity of a store for distribution center to the ZIP Code associated with a particular order. In some embodiments, this process is performed by the forecast disaggregator 206 of FIG. 2. The ship from store forecasts 316 are generated at the chain level for each item for the given time period. Similarly, the ship from distribution center forecasts 318 are generated at the chain level for each item for the given time period.

At operation 520, the chain level forecast for ship from distribution center sales is disaggregated down to an individual location level. In some embodiments, this operation can be performed by the forecast disaggregator 206 of FIG. 2. This results in an item/distribution center forecast 522, for ship from distribution sales on a per item basis.

The item/distribution center forecasts 522 account for all digital sales that are non-localized and thus are not attributed to any particular retail store. Each location still has its own forecast, but it is based on sales that could be fulfilled at other locations.

At operation 524, orders for a particular item, which are attributed to specific ZIP codes, are aggregated to and attributed to a specific location (e.g., a retail store location). By aggregating such historical ship to home orders into store-specific ship-to-home orders, it can be determined if the particular local store could fulfill that demand or whether the demand levels for a particular item may violate any local fulfillment constraints. At operation 526, a further aggregation may be performed to aggregate demand that was determined in operation 524 at a department or class level.

At operation 528, a disaggregation coefficient at the department/store level is created, based on the department/class level demand breakout by store. The disaggregation coefficient that is generated at the department/store level can then be used, in operation 530, to disaggregate the chain/item forecast determined in operation 516 (for ship from store sales) down to the item/location level. This results in the ship from store forecast 532.

At operation 538, historical, fulfilled sales by location are accessed. At operation 340, current eligibility by source of each item/node combination is accessed. Based on historical fulfilled sales, and the current eligibility of a source location by item, a further disaggregation coefficient may be determined at operation 542 at the class/location level. The localized sales determined in operation 510 may then be disaggregated from a chain level to store or retail location level using the disaggregation coefficients, at operation 544. This results in a total localized forecast 546, by item and location.

At operation 548, the total localized sales forecast from operation 546 is combined with the ship from store forecast from operation 532. This results in a total forecast for digital sales at the item/location level. This digital forecast is adjusted to account for digital sales that should be attributed to particular retail stores.

Referring to FIG. 5 generally, it is noted that the methods of creating location-specific, per-item demand forecasts that are separable not only into store sales, but also into both localized and non-localized online demand, improves both the overall accuracy of a forecast by determining what portions of overall future demand must be fulfilled from particular locations, and what portion of overall future demand may be attributable to a location but not necessarily tied to that location, and therefore, in conjunction with any constraints on retail locations or volumes of items that may flow within a physical supply chain, forecasts may be tied to item planning processes in a way that can ensure appropriate local placements of items. For example, an item placement planning system may utilize this improved forecasting to adjust a location for items that may be shipped to home from a store, e.g., by changing a location or placement of the item among stores near a forecast ZIP code from which an order will be received where constraints might otherwise have prevented item stocking.

III. Demand Forecasting System and Model Management

Referring now to FIGS. 6-9, additional details are provided regarding an architecture and environment in which demand forecasting models may be managed and selected for use, as well as instances in which such models may be updated in a manner that is sensitive to the specific item to which the model is directed. That is, based on the specific item characteristics (e.g., whether a new item, a fast-selling item, an item with inadequate sales history, a slow-selling item, a seasonal item, or an item that is stocked in fewer than all retail locations), a model may be created, maintained, and trained in different ways. This ensures accuracy of each model while reducing the significant computing demands caused by frequent retraining of each model. Since the models described herein are generally created on a per-item, per-location basis, within a large supply chain, retraining processes would otherwise be significantly more computationally burdensome.

Figure 6:
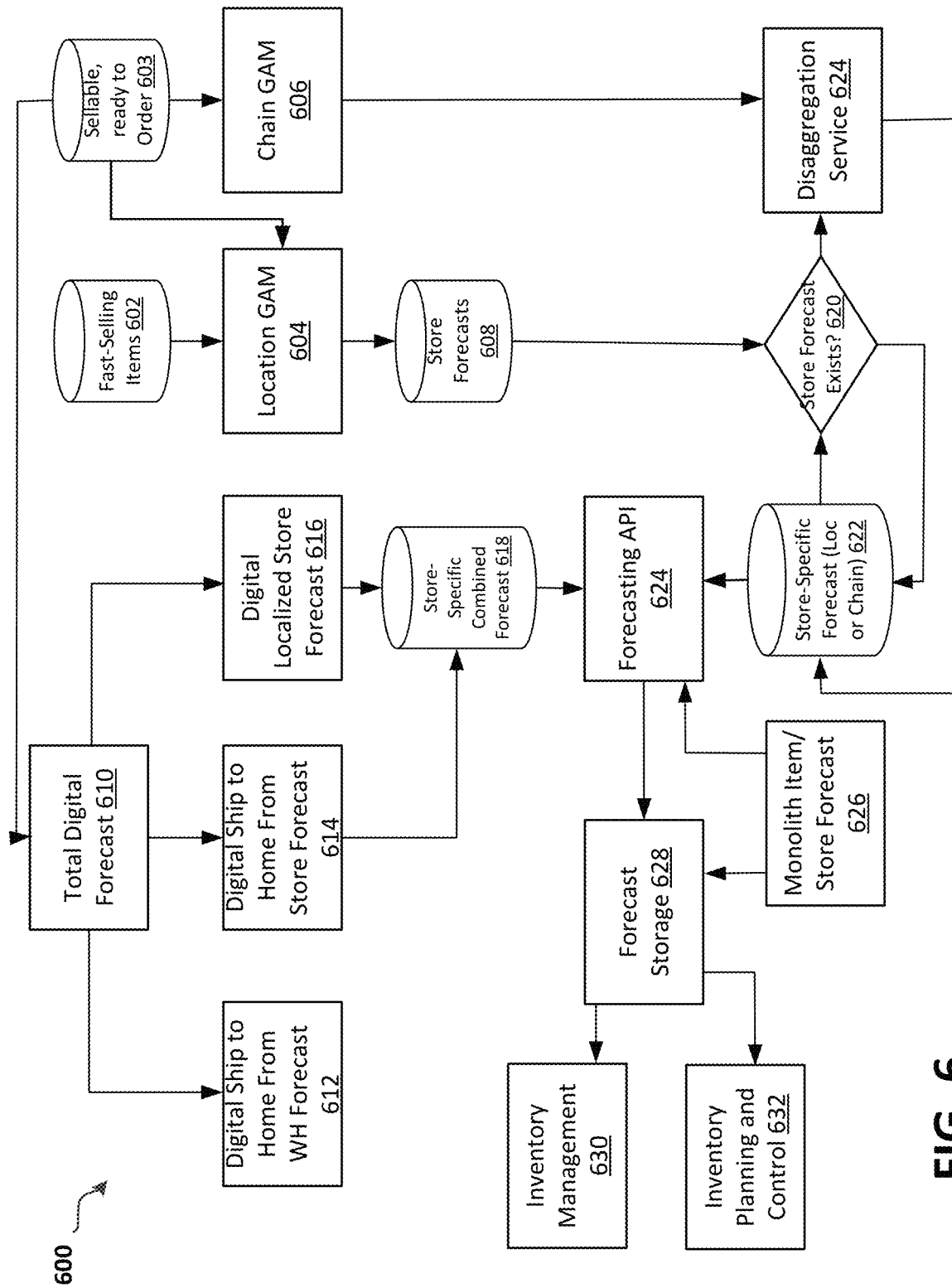
FIG. 6 is an architecture diagram of a multi-channel demand planning system within which aspects of the present disclosure may be implemented.

FIG. 6 is an architecture diagram of a multi-channel demand planning system 600 within which aspects of the present disclosure may be implemented. The multi-channel demand planning system 600 may be used as system 200 of FIG. 2, and in particular, for model creation and management of the various GAM models maintained within that system.

In the example shown, sales data sources including a fast selling items database 602 and a sellable items database 603 may be used to create a location-specific GAM model 604 and a chain-level GAM model 606 for each item within a supply chain. The location-specific GAM models may be used to generate store forecasts 608.

In the example shown, a total digital forecast 610 is drawn from the sellable items database 604, and is broken down into a ship to home from warehouse forecast 612, ship to home from store forecast 614, and digital localized store forecast 616. Store-specific combined forecasts may be created from the ship to home from store forecast 614 and digital localized store forecast 616, and stored in a store-specific combined forecast database 618.

Concurrently, store forecasts for best-selling items at particular locations may be assessed, and, if such store forecasts exist (at operation 620) they may be stored in a store forecasts database 622. If no store forecasts exists, a disaggregation service 624 will receive the chain-level GAM model 606, and create store level forecasts for storage in the database 622.

In the example shown, the store forecasts in database 622 and the store specific combine forecasts stored in database 618 are accessible via a forecasting API 624. The forecasting API also receives a per item store forecasts for item demand from a monolith forecasting system 626, which does not subsegment walk in or in store demand. A forecast storage system 628 will store per item, per location forecasts for each item and each location for a predetermined amount of time into the future.

Such stored forecasts may be accessible to an inventory management system 630 as well as an inventory planning and control system 632. The inventory management system 630 may manage movement of items among locations within a retail supply chain, while the inventory planning and control system 632 may plan for, and in some instances automatically reorder, items based on demand expected to occur. In both instances, one or more forecasts for the item, as retrieved from databases 618, 622 or as retrieved from the monolith forecasting system 626, may be provided such that on overall demand for at the item may be determined, as well as portions of demand that are associated with different types of digital order online orders. In examples, the inventory management system 630 and inventory planning and control system 632 may implement aspects of the positioning operations 421,452 described above in conjunction with FIG. 4.

Figure 7:
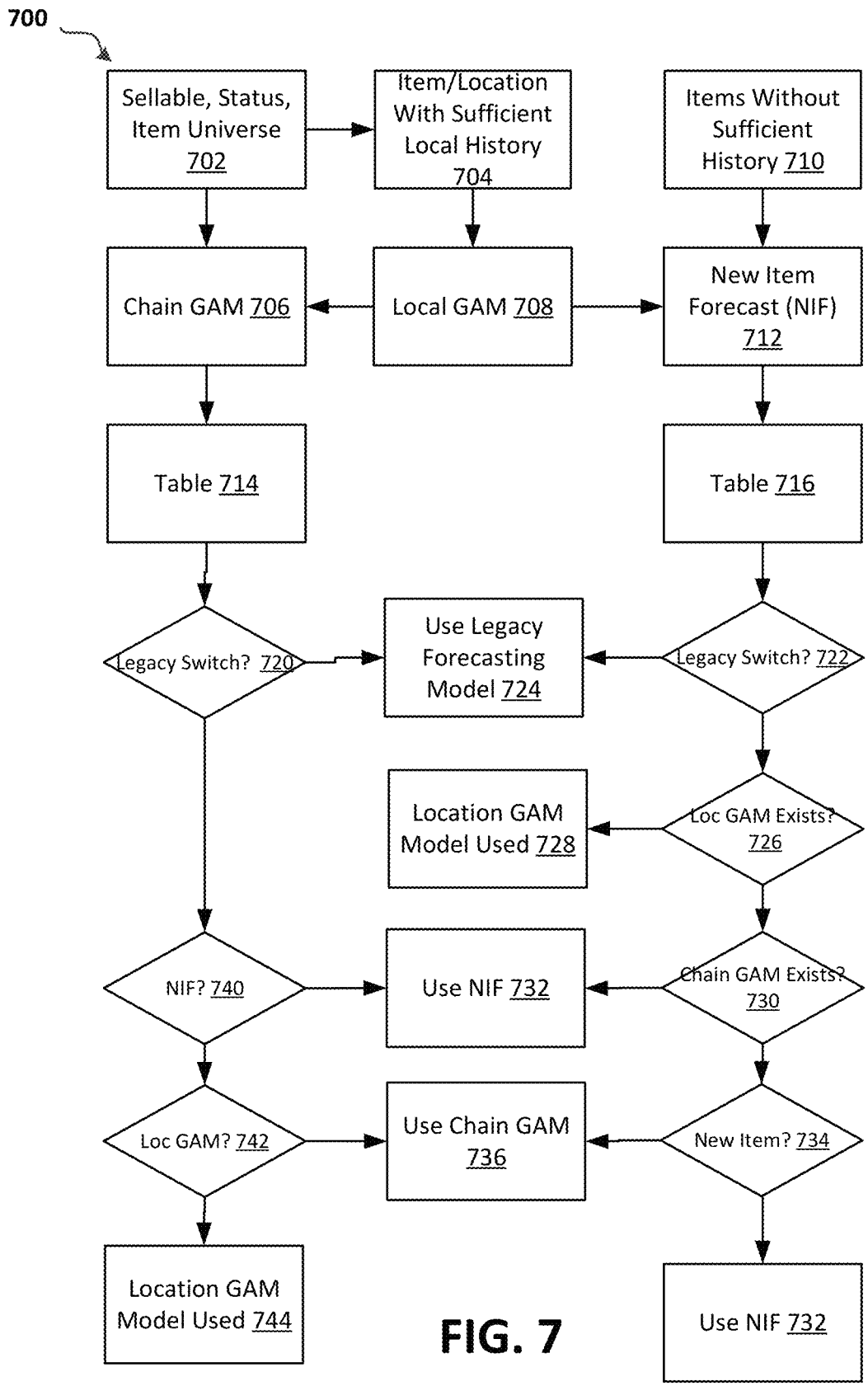
FIG. 7 is a logical flow diagram illustrating selection among a plurality of different demand forecast models within the multi-channel demand planning system described herein.

FIG. 7 is a logical flow diagram illustrating a system 700 for selection among a plurality of different demand forecast models within the multi-channel demand planning system described herein. The system 700 may be used, for example, at the forecasting API 624 and forecast storage system 628 to determine an appropriate forecast to be used in response to a request for a particular forecast from an external system such as an inventory planning and control system or an inventory management system as described above.

In the example shown, a universe of sellable items 702 may be used to generate a chain level model, such as a chain GAM 704. The universe of syllable item 702 may also be used to access item location information 706, to determine whether each location has sufficient item sales history to generate a location specific demand model. If so, a local model, such as a local GAM 708, may be generated.

Additionally, for items that lack sufficient sales history 710 either at the location level or at the chain level, a new item forecast (NIF) 712 is generated. The new item forecast 712 may be generated at the local level, and may be informed by local demand that is modeled for other, similar items. In some instances, such local, similar items may be items within a common class and at a common price point to the new item that is forecasted. Upon creation of the models, tables 714, 716 are created that provide a listing of the models that are available for use, including models for each item at each location, as well as models at coarser granularity, such as a class level, region level, department level, etc.

After models are created, a series of operations may be performed to determine which model would be most appropriate for use. The operations may be performed, in some embodiments, by the multichannel demand planner 202 of FIG. 2, such that demand forecast consumers 220 may receive one or more demand forecasts from a unified system, but may not be required to select from among a plurality of similar demand forecasts. Rather, the multichannel demand planner 202 may select an appropriate demand forecast (and associated model) on behalf of the requesting entity, thereby simplifying the external process while exposing additional granularity as to the channel on which demand is expected, where available.

At a first set of operations 720, 722 a determination of whether to utilize a legacy forecasting system is performed. The determination of whether to use the legacy forecasting system may be set by a model manager (e.g., in a human-defined or automated manner), or based on the relative expected accuracy of the legacy modeling and the GAM modeling described herein. This determination of whether to use a legacy forecasting system can be performed on a per item basis, a per location basis, on the basis of both item and location, or on some other basis (e.g., by department, or globally within the enterprise). Such operations allow an enterprise to gradually migrate from a legacy demand forecasting model to a multichannel demand forecasting arrangement such as described herein, without requiring that all items and locations are modeled using the multichannel modeling before its use for any forecasting. If it is determined at either operation 720, 722 to utilize a legacy forecasting system, a legacy forecasting model is accessed at operation 724, and provided the requested parameters (e.g., the timeframe, item or items, location or locations, etc.) to generate an appropriate forecast.

Operation 726 determines whether, for a given item, a location-specific GAM model is available. If such a model is available, at operation 728 such a location GAM model is used. If no such model is available, a further operation 730 determines whether a chain GAM model exists. If a chain GAM model does not exist, a new item forecast model is used at operation 732. If a chain GAM model does exist, however, at operation 734 it is determined whether the item is a new item. If the item is not a new item, the chain GAM model determines to exist in operation 730 is used in operation 736. If the item is a new item, at operation 738 the new item forecast model is used, irrespective of whether a chain GAM model is available.

In example embodiments, operations 722, 726, 730, and 734 are utilized in the circumstance that a location specific GAM model is available for the identified item. However, in some instances only a chain level GAM model is available for a given item, and a demand forecast is generated from that model using disaggregation techniques as described above. In the circumstances, a slightly different ordering of determinations of an appropriate model may be utilized. In particular, following operation 720, it may be determined at operation 740 whether a new item forecast model exists for the item. If so, the new item forecast model is used at operation 732 as above. If no new item forecast model is available, it is determined whether a location specific GAM model is available at operation 742. In this case, the location specific GAM model may be a disaggregated model for a particular item, class, etc. Such a model may be used, if available, at operation 744. If no location specific GAM model is available, the chain GAM model may be used, at operation 736 as noted above.

Referring to FIG. 7 generally, the determination of whether an item is a new item may be based on one or more criteria. For example, an item may be designated as a new item if that item has less than a predetermined amount of prior sales history available for it. In some examples, this may be an item having less than 52 weeks of sales history, or in some instances less than 12 to 24 weeks of sales history. In further examples, the determination of whether an item is a new item is configurable or adjustable, and may be based on both the amount of time the item has been offered for sale and volumes of sales of that item.

Figure 8:
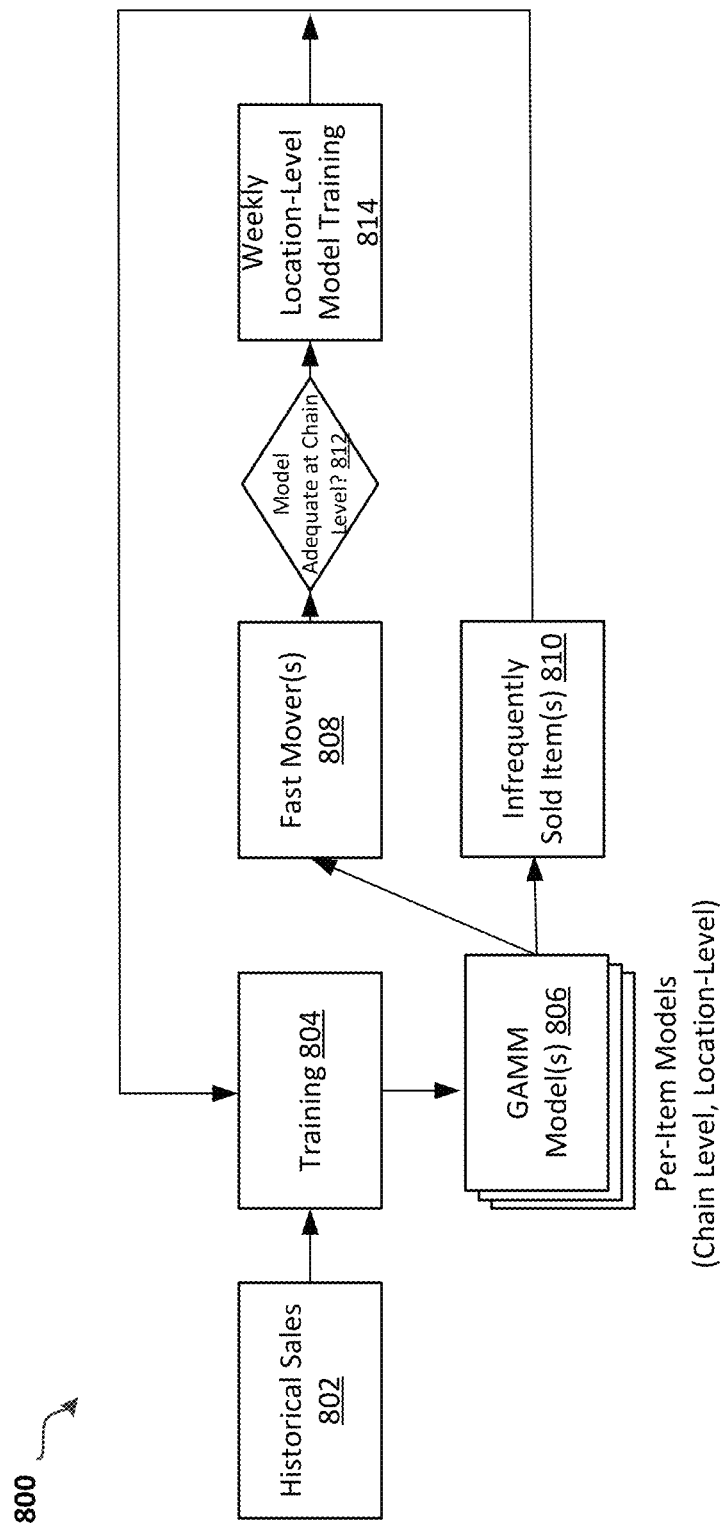
FIG. 8 is a logical flow diagram illustrating example methods of performance optimization of individual demand forecasting models, in example embodiments.

FIG. 8 is a logical flow diagram illustrating example performance optimization processes 800 for managing individual demand forecasting models, in example embodiments. The performance optimization processes 800 described herein may be used for management and updating of the GAM models described herein, and in particular are useful in reducing computing loads where large numbers of GAM models are maintained (e.g., in a large retail organization).

In the example shown, historical sales 802 are access to generate training data sets 804 for creation of GAM models 806 (in some instances, GAMM models) on a per item basis. These models may be, as noted above, either generated for a chain level, or a location level, or both. Accordingly, there are a large number of models that are generated and maintained. Depending on characteristics of the item, different models may be updated at different rates to manage the extent to which computational resources are required to be used. In typical cases, models may be updated on a regular or semi regular basis, e.g., daily or weekly.

In the example shown, the GAM models 806 may be separated into models associated with fast-moving items 808 (e.g., paper towels, bananas, other stable items) and infrequently sold items 810 (e.g., outdoor furniture, etc.). For fast-moving items 808, it is determined whether a model available at the chain level is adequate for obtaining an accurate demand forecast, at operation 812. If use of a chain level forecasts (e.g. and disaggregated as described herein) is not adequate, then a weekly location level model training process 814 can be performed for those items. However, if the chain level forecast model is adequate for particular items, creation of an additional model at the location level is unnecessary, and can be avoided to reduce compute time.

By selecting particular models for regular updating and excluding certain other models (e.g. models that will not change significantly between training periods) and overall improvement in location level training time may be gained. In some instances, up to 2-3 times less training time is required to achieve similar model accuracy.

In some example embodiments, rather than re-training an entire model, additionally for some items each model may be incrementally trained using newly available data. Still further, rather than performing a scoring process on each model as part of the training, scoring may be performed on less than the entire item universe each time a model is retrained or re-created. Still further, as part of the retraining process, the various models may be trained on distributed computing systems, for example using Apache Spark.

In some further example embodiments, for particular models that require a significant amount of training time (e.g., greater than one hour), such models may be eliminated, thereby allowing the system to selectively choose to use a chain level model for that item, or otherwise use a classification level model for the item, thereby using the item classification as a proxy for the item itself when forecasting item demand.

Referring to FIGS. 1-8 generally, it is noted that the ability to separately consider item demand on a per location basis across a variety of sales or delivery channels provides a number of computational advantages with respect to accuracy of the overall system. For example, in previous systems, a particular retail location would be credited with an online sale if the item is shipped from that particular retail location to the customer, since the transaction occurred from that retail location. However, in the current forecasting arrangements, non-localized demand that is in fact fulfilled from a particular retail location is no longer attributed to that particular retail location necessarily, but can be considered non-localized and accounted for on a more general basis (e.g., from any of a variety of retail locations or warehouses that may be able to fulfill that particular component of demand).

Similarly, in circumstances where a customer visits a retail location to purchase an item but that item is out of stock so the customer purchases the item online for shipment from a warehouse, previous systems would not have accounted for this as location-specific demand, but instead would credit the demand to whatever store or warehouse in fact fulfilled the order, irrespective of whether that would be the best place location for order fulfillment. This may lead to improved accuracy in future item placement within a retail supply chain.

Still further, online orders shipped directly from a warehouse, such as a distribution center, will be considered non-localized demand. However, the use of, and tying such orders to order destination ZIP Codes, allows for better localization of such orders such that, in the future, allocation of items throughout a retail supply chain may be plan to such that the item could be closer to the customer in the future (e.g., at a different warehouse or at one or more retail locations that are closer to the customer and therefore more responsive, and able to ship at lower cost).

Furthermore, as customer buying trends change, the demand shift of store-attributed demand to entirely digital (non-localized) can be quantified and tracked over time.

IV. Example Computing Systems for Implementing Demand Forecasting

Figure 9:
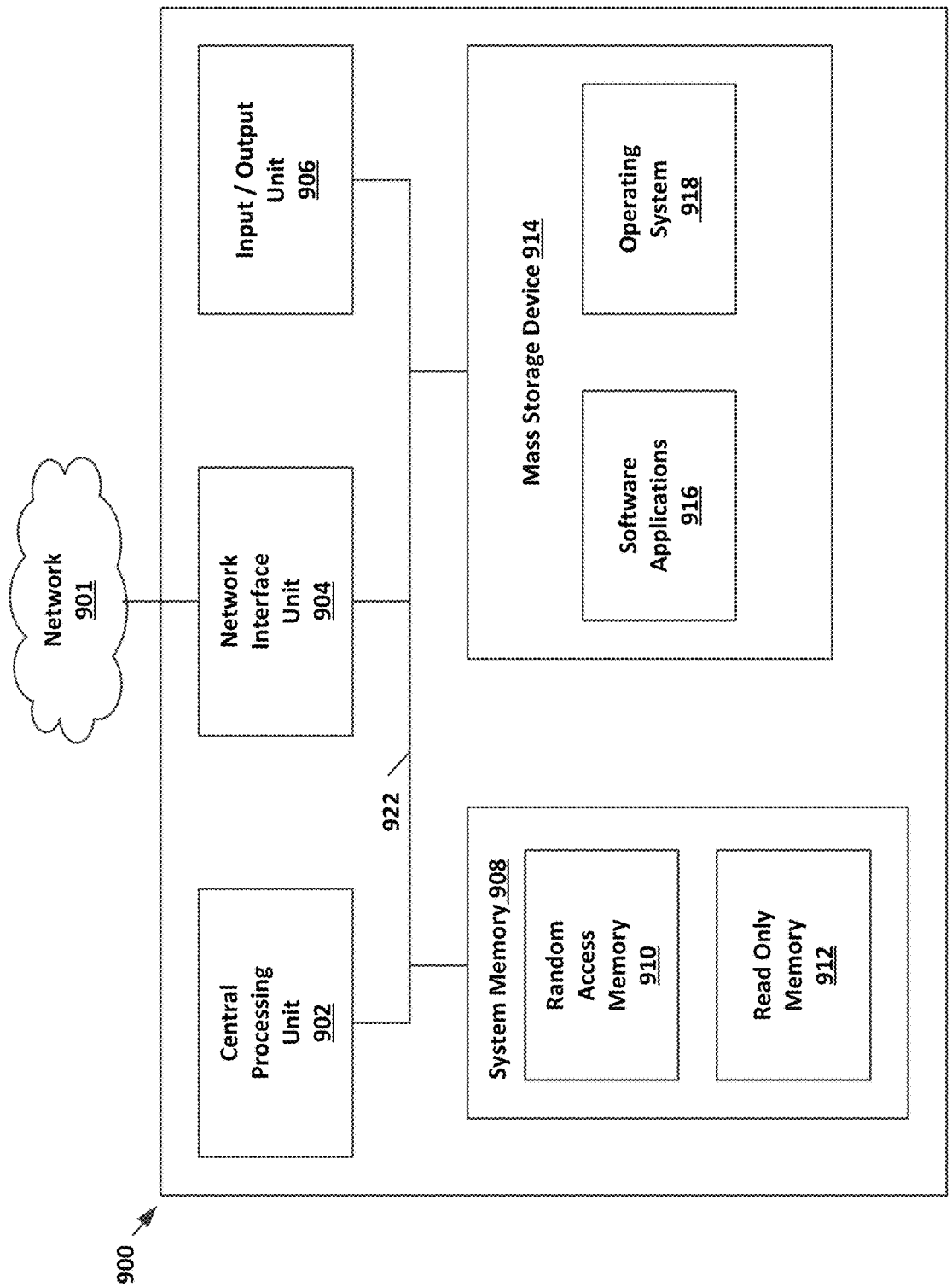
FIG. 9 illustrates an example computing system with which aspects of the present disclosure may be implemented.

Referring now to FIG. 9, an example block diagram of a computing system 900 is shown that is useable to implement aspects of the computing system 200 of FIG. 2. In the embodiment shown, the computing system 900 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the computing system 106, such as during startup, is stored in the ROM 912. The computing system 106 further includes a mass storage device 914. The mass storage device 914 is able to store software instructions and data.

The mass storage device 914 is connected to the CPU 902 through a mass storage controller (not shown) connected to the system bus 922. The mass storage device 914 and its associated computer-readable storage media provide non-volatile, non-transitory data storage for the computing system 106. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 902 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 106.

According to various embodiments of the invention, the computing system 106 may operate in a networked environment using logical connections to remote network devices through a network 901, such as a wireless network, the Internet, or another type of network. The computing system 900 may connect to the network 922 through a network interface unit 904 connected to the system bus 922. It should be appreciated that the network interface unit 904 may also be utilized to connect to other types of networks and remote computing systems. The computing system 900 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the computing system 106 can store software instructions and data. The software instructions include an operating system 918 suitable for controlling the operation of the computing system 106. The mass storage device 914 and/or the RAM 910 also store software instructions, that when executed by the CPU 902, cause the computing system 900 to provide the functionality discussed in this document. For example, the mass storage device 914 and/or the RAM 910 can store software instructions that, when executed by the CPU 902, cause the computing system 900 to receive and analyze inventory and demand data.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for forecasting demand for each of a plurality of items sold through multiple sales channels of a retail enterprise having a plurality of locations, the system comprising:
at least one processor and at least one memory device, the memory device storing instructions that, when executed by the at least one processor, cause the system to perform:
training a generalized additive model (GAM) using historical sales data of a retail enterprise, the historical sales data including online sales data, to determine an overall item demand forecast for a future time period;
separating the overall item demand forecast into a localized item demand forecast and a non-localized item demand forecast based, at least in part, on an item eligibility for localized item fulfillment and historical localized and non-localized item ordering information;
for the non-localized item demand forecast, determine a portion of non-localized item demand able to be fulfilled from a retail location and a remaining portion of non-localized item demand to be fulfilled from a warehouse;
disaggregating the portion of non-localized item demand able to be fulfilled from a retail location at a location level to attribute sub-portions of the non-localized item demand to each of a plurality of retail locations;
disaggregating the localized item demand forecast into localized item demand at each of the plurality of retail locations;
combining the disaggregated localized item demand and the disaggregated non-localized item demand for each respective one of the plurality of retail locations to determine an overall online item demand for each of the plurality of retail locations;
in response to a request for item demand at an application programming interface (API) exposed by the system from a consumer system, the request identifying at least one item and one or more of the plurality of retail locations, returning, to the consumer system, an overall online item demand forecast for the at least one item at the one or more of the plurality of retail locations;
optimizing a plurality of models, the plurality of models including the GAM, wherein optimizing the plurality of models comprises selectively retraining the plurality of models by retraining a first one or more of the plurality of models at a first time and retraining a second one or more of the plurality of models at a second time that is delayed relative to the first time;
wherein selectively retraining the plurality of models comprises:
determining that the first one or more of the plurality of models are to be retrained at the first time based on an update to demand data for a first one or more items forecasted by the first one or more of the plurality of models; and
determining that the second one or more of the plurality of models are to be retrained at the second time that is delayed relative to the first time based on a lack of an update to demand data for a second one or more items forecasted by the second one or more of the plurality of models.

2. The system of claim 1, wherein the historical sales data further includes in-store sales data.

3. The system of claim 1, wherein the historical sales data includes item-level sales data from each of the plurality of retail locations.

4. The system of claim 1, wherein the instructions further cause the system to perform, in response to the request for item demand, returning an overall item demand forecast including the overall online item demand forecast and an in-store item demand forecast for the at least one item.

5. The system of claim 4, wherein the overall online item demand forecast and the in-store item demand forecast are returned separately from each other.

6. The system of claim 4, wherein the system is further configured to generate, from a separate demand forecast model, a second overall item demand forecast for each of the plurality of retail locations.

7. The system of claim 6, wherein the system is configurable to select between the overall item demand forecast and the second overall item demand forecast.

8. The system of claim 1,
further comprising the consumer system, wherein the consumer system comprises an inventory management application;
wherein the inventory management application is configured to receive the overall online demand forecast for the at least one item at the one or more of the plurality of retail locations; and
wherein the inventory management application is configured to, in response to receiving the overall online demand forecast, automatically generate a transfer order to route the at least one item from a first retail location of the one or more of the plurality of retail locations to a second retail location of the one or more of the plurality of retail locations.

9. The system of claim 1, wherein the at least one item includes a class of items.

10. The system of claim 1, wherein the generalized additive model is a generalized additive mixed model (GAMM).

11. The system of claim 1, wherein the overall item demand forecast for an item is based, at least in part, on historical sales of the item and other items having a commonality with the item.

12. A method of forecasting sales-channel specific demand through a retail supply chain fulfilling sales transactions received via multiple channels from a common set of retail locations, the method comprising:
training a generalized additive model (GAM) using historical sales data of a retail enterprise, the historical sales data including online sales data, to determine an overall item demand forecast for a future time period;
separating the overall item demand forecast into a localized item demand forecast and a non-localized item demand forecast based, at least in part, on an item eligibility for localized item fulfillment and historical localized and non-localized item ordering information;
for the non-localized item demand forecast, determine a portion of non-localized item demand able to be fulfilled from a retail location and a remaining portion of non-localized item demand to be fulfilled from a warehouse;
disaggregating the portion of non-localized item demand able to be fulfilled from a retail location at a location level to attribute sub-portions of the non-localized item demand to each of a plurality of retail locations;
disaggregating the localized item demand forecast into localized item demand at each of the plurality of retail locations;
combining the disaggregated localized item demand and the disaggregated non-localized item demand for each respective one of the plurality of retail locations to determine an overall online item demand for each of the plurality of retail locations; and
in response to a request for item demand at an application programming interface (API) exposed by the system from a consumer system, the request identifying at least one item and one or more of the plurality of retail locations, returning, to the consumer system, an overall online item demand forecast for the at least one item at the one or more of the plurality of retail locations;
optimizing a plurality of models, the plurality of models including the GAM, wherein optimizing the plurality of models comprises selectively retraining the plurality of models by retraining a first one or more of the plurality of models at a first time and retraining a second one or more of the plurality of models at a second time that is delayed relative to the first time;
wherein selectively retraining the plurality of models comprises:
determining that the first one or more of the plurality of models are to be retrained at the first time based on an update to demand data for a first one or more items forecasted by the first one or more of the plurality of models; and
determining that the second one or more of the plurality of models are to be retrained at the second time that is delayed relative to the first time based on a lack of an update to demand data for a second one or more items forecasted by the second one or more of the plurality of models.

13. The method of claim 12, wherein training a generalized additive model is performed to generate separate generalized additive models for each of a plurality of items including at least a first item and a second item.

14. The method of claim 13, wherein the first item is an item sold frequently as reflected in the historical sales data and the second item sold infrequently, and wherein a first model associated with the first item is retrained more frequently than a second model associated with the second item.

15. The method of claim 13, wherein the separate generalized additive models for a first item include an item-location level model and an item-chain level model.

16. A system for forecasting demand for each of a plurality of items sold through multiple sales channels of a retail enterprise having a plurality of locations, the system comprising:
at least one processor and at least one memory device, the memory device storing instructions that, when executed by the at least one processor, cause the system to perform:
training a generalized additive model (GAM) using historical sales data of a retail enterprise for each of a plurality of items carried by the retail enterprise, the historical sales data including online sales data, to determine an overall item demand forecast for a future time period for each of the plurality of items, in accordance with a training frequency that is based, at least in part, on sales behavior of the item reflected in the historical sales data;
for at least one item of the plurality of items:
separating the overall item demand forecast into a localized item demand forecast and a non-localized item demand forecast based, at least in part, on an item eligibility for localized item fulfillment and historical localized and non-localized item ordering information;
for the non-localized item demand forecast, determine a portion of non-localized item demand able to be fulfilled from a retail location and a remaining portion of non-localized item demand to be fulfilled from a warehouse;
disaggregating the portion of non-localized item demand able to be fulfilled from a retail location at a location level to attribute sub-portions of the non-localized item demand to each of a plurality of retail locations;

disaggregating the localized item demand forecast into localized item demand at each of the plurality of retail locations;

combining the disaggregated localized item demand and the disaggregated non-localized item demand for each respective one of the plurality of retail locations to determine an overall online item demand for each of the plurality of retail locations; and in response to a request for item demand at an application programming interface (API) exposed by the system from a consumer system, the request identifying the at least one item and one or more of the plurality of retail locations, returning, to the consumer system, an overall online item demand forecast for the at least one item at the one or more of the plurality of retail locations;

optimizing a plurality of models, the plurality of models including the GAM, wherein optimizing the plurality of models comprises selectively retraining the plurality of models by retraining a first one or more of the plurality of models at a first time and retraining a second one or more of the plurality of models at a second time that is delayed relative to the first time;

wherein selectively retraining the plurality of models comprises:

determining that the first one or more of the plurality of models are to be retrained at the first time based on an update to demand data for a first one or more items forecasted by the first one or more of the plurality of models; and determining that the second one or more of the plurality of models are to be retrained at the second time that is delayed relative to the first time based on a lack of an update to demand data for a second one or more items forecasted by the second one or more of the plurality of models.

17. The system of claim 1, wherein the instructions, when executed by the one or more processors, further cause the system to:

train a chain-level model and a location-level model for the at least one item;

create a table of available models for the at least one item, the table of available models including the chain-level model, the location-level model, and a legacy model;

select, for each item of the at least one item at the one or more of the plurality of retail locations, a model from the table of available models, wherein selecting the model from the table of available models comprises selecting at least the chain-level model in response to identifying a lack of location-specific data for the location-level model.

18. The system of claim 1, wherein the one or more items comprise a plurality of items;

wherein the instructions, when executed by the one or more processors, further cause the system to train the plurality of models for the plurality of items, wherein each model of the plurality of models is trained specifically for a respective item of the plurality of items;

wherein training the plurality of models comprises:

for a first model of the plurality of models corresponding to a first item of the plurality of items, identifying first historical sales data for the first item at a store;

training the first model using the first historical sales data for the first item at the store;

for a second model of the plurality of models corresponding to a second item of the plurality of items, identifying a lack of historical sales data for the second item at the store; and in response to identifying the lack of historical sales data of the second item at the store, training the second model using historical sales data of the second item at a plurality of stores or training the second model using historical sales data of items in a common class as the second item at the store.

19. The system of claim 1, wherein selectively retraining the plurality of models comprises determining, for each model of the plurality of models, whether to retrain the model based on an accuracy of the model.

20. The system of claim 1, wherein retraining the first one or more of the plurality of models at the first time comprises incrementally training the first one or more models using only the update to demand data for the first one or more items as training data.

* * * * *